(12) United States Patent
Greene

(10) Patent No.: US 10,110,781 B2
(45) Date of Patent: Oct. 23, 2018

(54) RESTORING THE APPEARANCE OF SCANS OF DAMAGED PHYSICAL DOCUMENTS

(71) Applicant: ADOBE SYSTEMS INCORPORATED, San Jose, CA (US)

(72) Inventor: Andrew Marc Greene, Newtonville, MA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/191,499

(22) Filed: Jun. 23, 2016

(65) Prior Publication Data
US 2017/0374236 A1   Dec. 28, 2017

(51) Int. Cl.
*H04N 1/60* (2006.01)
*G06K 9/00* (2006.01)
*G06T 5/00* (2006.01)
*H04N 1/56* (2006.01)

(52) U.S. Cl.
CPC ....... *H04N 1/6027* (2013.01); *G06K 9/00402* (2013.01); *G06K 9/00442* (2013.01); *G06T 5/005* (2013.01); *H04N 1/56* (2013.01); *G06T 2207/10008* (2013.01); *G06T 2207/10024* (2013.01); *G06T 2207/30176* (2013.01)

(58) Field of Classification Search
CPC .......... G06K 9/00422; G06K 9/00456; G06K 9/00402; G06K 9/00442; G06T 5/001; G06T 5/005; H04N 1/6027; H04N 1/56
See application file for complete search history.

(56) References Cited

U.S. PATENT DOCUMENTS

| | | | | |
|---|---|---|---|---|
| 7,623,706 B1* | 11/2009 | Maurer | .................. | H04N 19/60 382/167 |
| 2009/0067709 A1* | 3/2009 | Gross | ................. | H04N 1/40062 382/166 |
| 2010/0027886 A1* | 2/2010 | Kang | ..................... | H04N 9/045 382/167 |
| 2010/0110238 A1* | 5/2010 | Kang | ..................... | H04N 9/045 348/242 |
| 2010/0265366 A1* | 10/2010 | Oota | .................. | H04N 5/23296 348/242 |
| 2014/0119650 A1* | 5/2014 | Zhou | ..................... | H04N 1/6027 382/167 |
| 2014/0232737 A1* | 8/2014 | Zhang | ..................... | G02B 27/14 345/589 |

(Continued)

*Primary Examiner* — Jingge Wu
(74) *Attorney, Agent, or Firm* — Brake Hughes Bellermann LLP

(57) ABSTRACT

Systems and methods for restoring the appearances of scans of damaged physical documents. Ink bleed is removed and/or ink added to portions of a scanned image based on determining an ink bleed model by analyzing colors of pixels in the scanned image. Gaps in strokes are reconstructed based on analyzing pixel color at multiple angles around individual pixels in the scanned image to determine whether the individual pixels are part of a stroke. The appearance of the scanned image is also enhanced by comparing pixels that are not already close to a background color or ink color with other nearby pixels and, based on the nearby pixels, adjusting colors of the pixels that are not already close to the background color or ink color. These techniques are used individually or in combination to improve the appearance of the scanned image.

20 Claims, 9 Drawing Sheets

(56) References Cited

U.S. PATENT DOCUMENTS

| | | | | |
|---|---|---|---|---|
| 2015/0015918 A1* | 1/2015 | Eguchi | ............... | G06K 15/1872 358/3.27 |
| 2015/0070379 A1* | 3/2015 | Fan | ......................... | G06T 15/08 345/594 |
| 2015/0206285 A1* | 7/2015 | Pajak | ...................... | G06T 5/002 382/265 |
| 2016/0375718 A1* | 12/2016 | Van Garsse | ............... | B44C 5/04 52/311.1 |

* cited by examiner

RESTORING THE APPEARANCE OF SCANS OF DAMAGED PHYSICAL DOCUMENTS

TECHNICAL FIELD

This disclosure relates generally to computer-implemented methods and systems and more particularly relates to improving the efficiency and effectiveness of computing systems used to alter the appearance of electronic images that are scans of physical documents.

BACKGROUND

Many physical documents have suffered damage, for example due to exposure to water or moisture. People have tried to edit scanned images of damaged documents to improve the appearance of the documents using various software tools but the quality of such restoration efforts is generally unsatisfactory especially with respect to text and writing in the documents. For example, photo editing software applications generally do not satisfactorily repair the appearance of scanned documents containing printed or written writings.

SUMMARY

Systems and methods for restoring the appearances of scans of damaged physical documents are disclosed. Ink bleed is removed and/or ink added to portions of a scanned image based on determining an ink bleed model by analyzing colors of pixels in the scanned image. Gaps in strokes are reconstructed based on analyzing pixel color at multiple angles around individual pixels in the scanned image to determine whether the individual pixels are part of a stroke. The appearance of the scanned image is also enhanced by comparing pixels that are not already close to a background color or ink color with other nearby pixels and, based on the nearby pixels, adjusting colors of the pixels that are not already close to the background color or ink color. These techniques are used individually or in combination to improve the appearance of the scanned image.

An embodiment of the invention involves systems and methods for restoring appearances of scans of damaged physical documents using an ink bleed model. These systems and methods involve receiving a scanned image of a physical document that includes ink writing and determining an ink bleed model by analyzing colors of pixels in the scanned image of the physical document. The ink bleed model uses a gradient of colors based on ink colors having bleed at different rates on the physical document. The systems and methods restore the appearance of the scanned image of the physical document by changing colors of pixels of the scanned image to reduce the ink bleed based on the ink bleed model.

Another embodiment of the invention involves systems and methods for restoring appearances of scans of damaged physical documents by enhancing stroke appearance. The systems and methods involve receiving a scanned image of a physical document that includes ink writing and, for individual pixels of the scanned image, measuring decreases in darkness from the respective individual pixel by scanning pixels at multiple angles away from the respective individual pixel. Scores are assigned to the multiple angles based on the decrease in darkness at the respective individual angles and likelihoods are determined that the individual pixels are part of a stroke based on the assigned scores. A curve is then determined based on the likelihoods that the individual pixels are part of the stroke and the appearance of the scanned image of the physical document is restored by changing colors of pixels of the scanned image to make pixels on or near the curve darker, i.e., more like the ink color.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
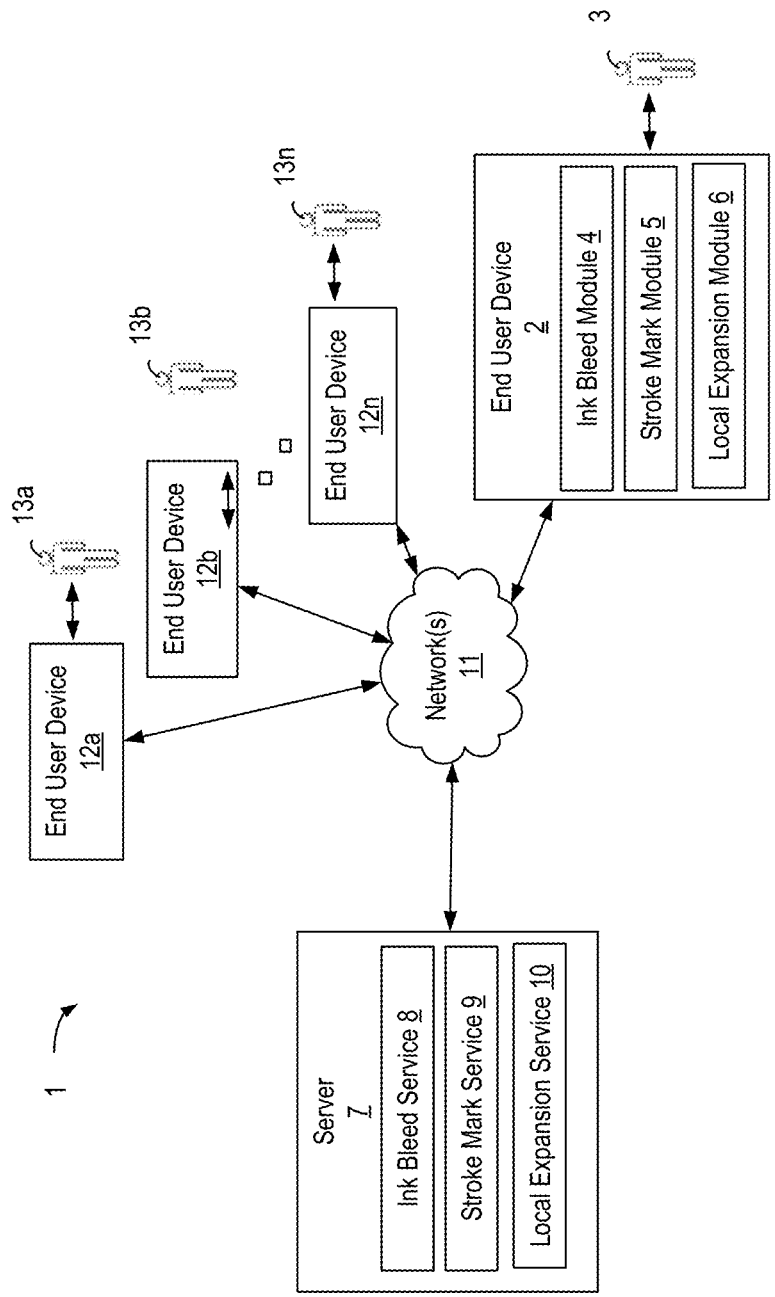
FIG. 1 illustrates an exemplary computer environment for restoring the appearances of scans of damaged physical documents.

As discussed above, existing efforts to restore the appearance of scans of damaged physical documents, for example, using photo editing software applications have generally been unsatisfactory at repairing the appearance of scanned documents containing printed or written writings. The invention provides several features that are used singly, or in combination, to repair the appearance of scanned documents containing printed or written writings in more satisfactory ways. A first embodiment of the invention corrects for ink bleeds using color gradients. The color gradients are used to adjust pixel colors based on the recognition that different color components bleed at different rates. For example, yellow tends to bleed faster than other colors, and therefore tends to bleed farther on a wet or old document. Pixels in the document having colors that are within the bleed model are considered to likely have such colors as a result of ink bleed. The colors of the pixels are adjusted to reduce the appearance of the ink bleed. The colors of some pixels are shifted towards the background color (usually a white color). The colors of other pixels are shifted towards the ink color (usually a black, blue, or other dark color).

The shifting of pixel colors towards background color or ink color is based on where the respective pixel's color is within the color gradient in one embodiment. For example, yellow pixels are adjusted towards the background color given an ink bleed model in which yellow bleeds the most distance and is thus at the far end of the color gradient and unlikely to have been a part of the original stroke.

In another embodiment, the colors of a sequence of pixels in the document is used to recognize a color gradient and adjust the pixels accordingly. For example, if the system detects a sequence of grey pixels adjacent to red pixels adjacent to orange pixels adjacent to yellow pixels, the grey pixels at the end of the sequence are darkened towards the ink color and the other grey and the red, orange, and yellow pixels are lightened towards the background color.

A second embodiment of the invention reconstructs short gaps and emphasize faint stroke marks in scanned images of physical documents by modelling the path and/or speed of the pen or the shapes of the typewritten letters. In one example, by analyzing nearby pixels, each pixel is assigned a likelihood of being at the center of a stroke and/or the most likely direction that the stroke took. These assignments are used to model the path and speed of the pen, and ultimately to reconstruct short gaps, emphasize faint stroke marks, and otherwise reconstruct letters and language characters.

A third embodiment of the invention expands the dynamic range of individual pixels relative to their respective neighborhood, so areas that are damaged are improved and areas that are less damaged are left untouched. Each pixel is compared to the pixels in its neighborhood. If the pixel is already close to white or black it is left unchanged; otherwise, its pixels are adjusted based on their surroundings. For example, a grey pixel that is not similar to either the background color or an ink color and is surrounding by light colored (white or light grey) pixels, the pixel is darkened based on the determination that it is likely part of a legitimate mark.

These exemplary techniques are used singly or in combination to repair the appearance of scanned documents containing printed or written writings in more satisfactory ways. The techniques of the invention are generally more satisfactory that prior attempts. For example, using the specific properties of ink bleed on paper to reconstruct original ink placement provides a more accurate repair of ink bleed than prior techniques. As another example, using the specific properties of letter formation to reconstruct original ink placement provides generally better letter reconstruction than prior attempts. In addition, several of the techniques of the present invention are suitable for automatic execution or use by users of limited computer-based editing sophistication, allowing users to run automatic processes or run processes with easily controlled adjustments to achieve desired appearance adjustments. Such techniques do not require the user to have proficiency in image editing tools and, in appropriate circumstances, are executed unattended on a large number of documents.

As used herein, the phrases "scan" and "scanned image" refer to a digital image of a physical document that includes ink writing. Digital images are captured using image cameras and other scanning devices that optically scan physical documents and typically include data that represents one or more colors of pixels that collectively form the image. Digital images are stored on electronic devices in memory, transferred between electronic devices via cables and networks, displayed on video monitors and screens of electronic devices, and printed on paper and other materials using computer printing devices.

As used herein, the phrase "ink writing" refers to any mark or marking made by an ink-based writing instrument or machine on a physical document. Examples of ink writing are hand-drawn sketches, symbols, and text, typewriter-produced documents, and ink-based machine printer-produced documents. Ink writing can include one or more colors.

As used herein, the phrase "physical document" refers to any real-world material (whether flexible or rigid) upon which ink writing have or can be made. Physical documents can, but need not, be produced by pressing together fibers of cellulose pulp derived from wood, rags, grasses, and other materials, and drying them into sheets. Physical documents include, but are not limited to, papers, parchments, letters, scrolls, books, notebooks, loose-leaf documents, newspapers, magazines, cardboard documents, and writings on wood and stone.

As used herein, the phrase "ink bleed" refers to some or all of a stroke or other portion of ink writing that moves from its original position as produced by the writing instrument or machine to a nearby position. For example, the ink from a written period (".") may bleed in a particular direction from the original position of the period to produce a line moving away from the original position of the period in that direction. If the ink used to produce the period is made from several different color inks, the component inks may bleed at different rates over time and thus move different amounts. The result, in this example, is ink bleed that appears as a multiple color line extending away from the original position of the period for example with grey near the original position of the ink, a second color adjacent to that, a third color adjacent to the second color, etc.

As used herein, the phrase "ink bleed model" refers to an expectation of how ink writing will bleed. In one example, an ink bleed model is a gradient of a particular sequence of colors from ink colors having bled at different rates. In one example, an ink bleed model is determined by analyzing the colors on a scanned image of a physical document and/or the relative locations of colors therein to identify a particular sequence of colors. Finding a particular sequence of colors in multiple locations in the scan can be the basis of identifying that sequence as an appropriate gradient for an ink bleed model for the document and/or similar documents.

As used herein, the phrase "background color" refers to one or more colors of a physical document upon which ink writing is produced. The background color of a physical document can change as the document ages. For example, an old physical document may have background colors that change from one or more shades of white to one or more shades of off-white or yellow as the physical document ages.

As used herein, the phrase "pixel" refers to a point in a scanned image of a physical document. Each pixel has a single color. In one example, pixels are the smallest addressable elements in the scanned image. Pixels have locations in the scanned image and, for example, may be addressable using coordinates of the image.

As used herein, the phrase "shifting" of a color refers to changing a color to another color in a gradient of an ink bleed model. For example, if an ink bleed model has a sequence of colors from black to grey to red to yellow, a one position shifting changes yellow pixels to red, a two position shifting changes yellow pixels to grey, etc.

As used herein, the phrase "stroke" refers to a path of a pen or other writing instrument or machine that resulted in a continuous straight or curved line along the path. A "curve" can be part of a stroke or pen motion path.

As used herein, the phrase "darkness" refers to an attribute of a color representing how much black and how little white would be added to a hue to produce the color. The phrase "value" refers to how light or dark a color appears. White is added to make a color lighter in value and black is added to make a color darker in value. White is added to red to make pink and black is added to red to make maroon. Thus, maroon is darker than red and red is darker than pink.

FIG. 1 illustrates an exemplary computer environment 1 in which an exemplary system improves the appearances of scanned images of ink writings of old or otherwise damaged documents. The exemplary computer network environment 1 illustrates providing this functionality on an end user device 2 used by end user 3. End user device 2 includes an ink bleed module 4, a stroke mark module 5, and a local expansion module 6. The ink bleed module 2 removes ink bleed and adds ink to correct for ink bleed based on determining an ink bleed model by analyzing colors of pixels in the scanned image. The stroke mark module 5 reconstructs gaps in strokes based on analyzing pixel color at multiple angles around individual pixels in the scanned image to determine whether the individual pixels are part of a stroke. The local expansion module 6 enhances the appearance of the scanned image by comparing pixels that are not already close to a background color or ink color with other nearby pixels and, based on the nearby pixels, adjusting colors of the pixels that are not already close to the background color or ink color. These modules 4, 5, 6 are used individually or in combination to improve the appearance of the scanned image.

The exemplary computer network environment 1 also illustrates providing the image appearance improving functionality for end user devices 12a-12n that access a server 7. End user devices 12a-n are used by end users 13a-n for example to scan old or otherwise damaged documents and store scanned images of those physical documents. The end user devices 12a-n access the server 7 via electronic messages sent through network 11. In one example, server 7 provides a web page or other cloud based service that is accessed by the end user devices 12a-n. The server 7 includes an ink bleed module 8 that functions similar to ink bleed module 4, a stroke mark module 9 that functions similar to stroke mark module 5, and a local expansion module 10 that functions similar to local expansion module 6. In one example, the end user devices 12a-n upload scanned images that are altered on server 7 via the ink bleed module 8, the stroke mark module 9, and/or the local expansion module 10 and then the altered images are returned to the end user devices 12a-n. The end users 13a-n may use an interface provided from server 7 to specify image appearance improvement parameters. In one example, the end users 13a-n use such an interface to specify which image appearance functions will be performed (e.g., ink bleed correction, stroke mark correction, local expansion, etc.) and/or to specify parameters of the alterations performed by the ink bleed module 8, the stroke mark module 9, and/or the local expansion module 10.

Figure 2:
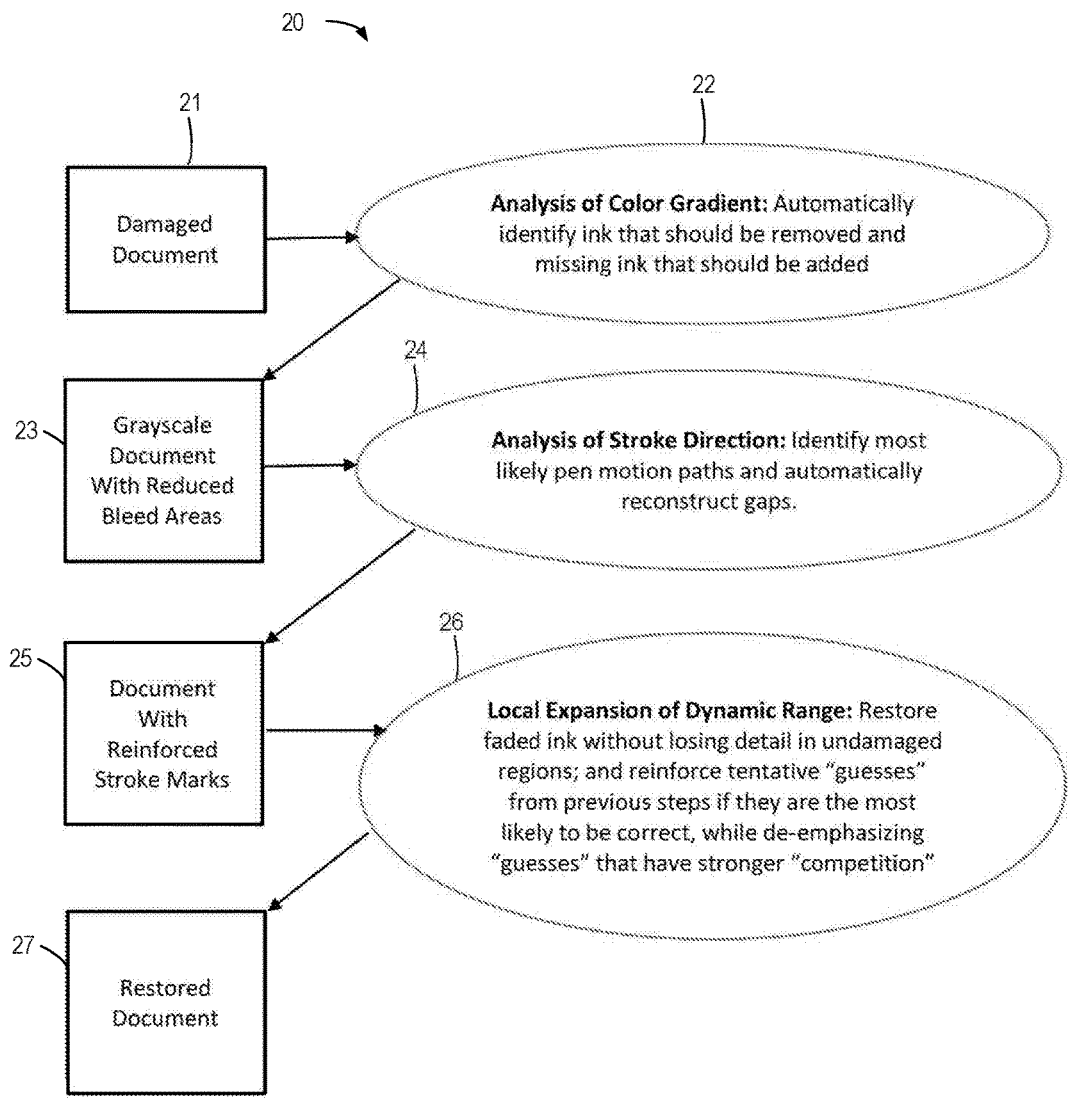
FIG. 2 illustrates an exemplary flow chart for restoring the appearances of scans of damaged physical documents.
Figure 3:
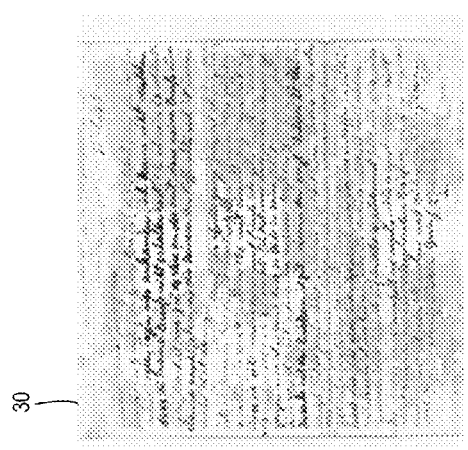
FIG. 3 illustrates an original scan of a water-damaged physical document.

FIG. 2 illustrates an exemplary flow chart for restoring the appearances of scans of damaged physical documents. In this example, a scan of a damaged document 21 is created. For example, an end user may use a scanning device to scan the surface of the physical document. In another example, the end user takes a picture of the document to create the scanned image of the document. FIG. 3 illustrates an example of an original scan of a water-damaged physical document 30. The original scan 30 (i.e., prior to corrective alterations) includes ink bleed, missing stroke segments, and other indications of document damage.

Figure 4:
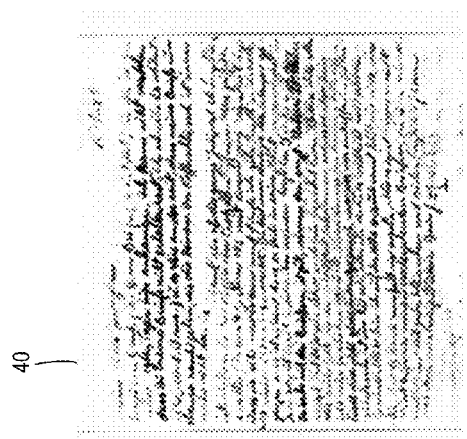
FIG. 4 illustrates the scan of the physical document of FIG. 3 modified based on a color-gradient-type modification.

Returning to FIG. 2, an analysis of the color gradient 22 is performed to automatically identify ink that should be removed and missing ink that should be added. The image is altered to address the identified ink issues and the result is a grayscale document with reduced bleed areas. In this example, the resulting document is greyscale because other colors of the ink bleed model are shifted along the gradient into one of the grey or black colors at the stroke color end of the gradient. For example, FIG. 4 illustrates a modified scan 40 of the original scan 30 of FIG. 3, modified based on such a color-gradient-type modification.

Figure 5:
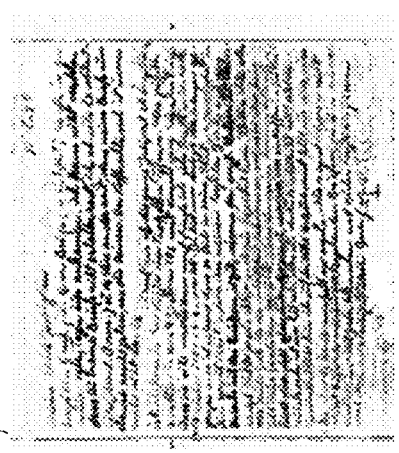
FIG. 5 illustrates the scan of the physical document of FIG. 4 modified based on a stroke direction-type modification.

Returning to FIG. 2, an analysis of stroke direction 24 is then performed to identify most likely pen motion paths and automatically reconstruct gaps. The result is a document with reinforced stroke marks 25. For example, FIG. 5 illustrates a modified scan 50 of the scan 40 of FIG. 4, modified based on such a stroke direction-type modification.

Figure 6:
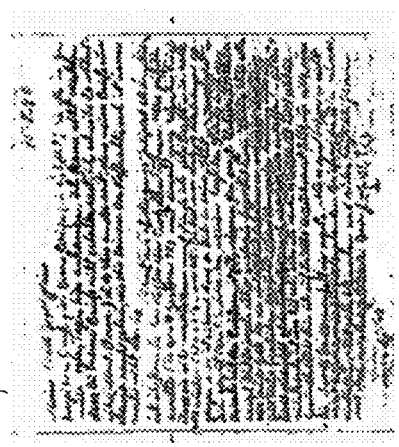
FIG. 6 illustrates the scan of the physical document of FIG. 5 modified based on a local expansion-type modification.

A local expansion of dynamic range 26 is next performed to restore faded ink without losing detail in undamaged regions of the document and reinforce tentative "guesses" from the previous steps 22, 24 that are most likely correct, while de-emphasizing "guesses" that have stronger competition from other guesses that are more likely to be correct. The result is a restored document 27 having an appearance that is appreciably better than the scan of the damaged document 21. For example, FIG. 6 illustrates a modified scan 60 of the scan 50 of FIG. 5, modified based on a local expansion-type modification.

Figure 7:
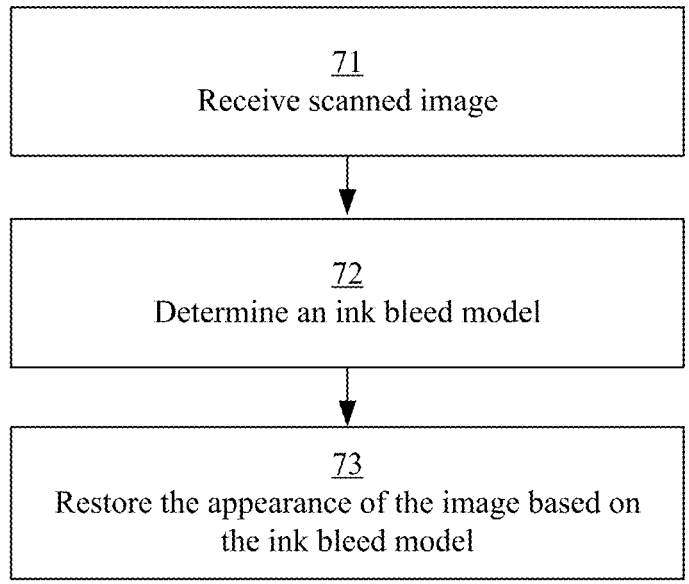
FIG. 7 illustrates an exemplary flow chart for restoring the appearances of scans of damaged physical documents using an ink bleed model.

FIG. 7 illustrates an exemplary flow chart for restoring the appearances of scans of damaged physical documents using an ink bleed model. Exemplary method 70 is performed by one or more processors of one or more computing devices such as device 2 or server 7 of FIG. 1. Exemplary method 70 involves receiving a scanned image, as shown in block 71. The scanned image can be received after being created on a local or remote device. For example, an end user may use a local device to scan or photograph the surface of the document. In another example, the end user receives the scanned image from a friend, museum, the Internet, or any other source. The exemplary method 70 further involves determining an ink bleed model, as shown in block 72, and restoring the appearance of the image based on the ink bleed model, as shown in block 73. An example of restoring the appearance of the image based on an ink bleed model as shown in block 73 is described next.

Figure 8:
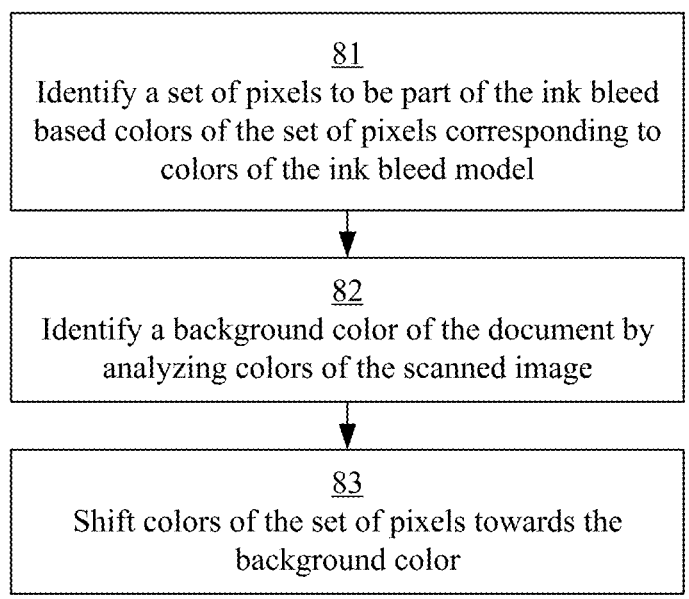
FIG. 8 illustrates an exemplary flow chart for restoring the appearances of scans of damaged physical documents using an ink bleed model to modify pixels.

FIG. 8 illustrates an exemplary flow chart 80 for restoring the appearances of scans of damaged physical documents using an ink bleed model to modify pixels. Exemplary method 80 is performed by one or more processors of one or more computing devices such as device 2 or server 7 of FIG. 1. Exemplary method 80 involves identifying a set of pixels to be part of the ink bleed model based on the colors of the pixels corresponding to colors of the ink bleed model. For example, if the ink bleed model includes ink color, grey, red, yellow, and then background color, then pixels of grey, red, and yellow are identified. Note that colors within particular ranges on color measuring scales can be identified. For example, all colors within a particular portion of a color wheel can be considered "red," etc. In another example, all colors having color attribute numbers for hue, saturation, and luminosity in particular ranges are considered a particular "color." Alternative color theory systems and color comparison techniques can additionally or alternatively be employed to match scanned image colors with colors on a color gradient of an ink bleed model.

Exemplary method 80 further involves identifying a background color of the document by analyzing colors of the scanned image, as shown in block 82. The most common color is identified as the background color in one example. The lightest color is identified as the background color in another example. In another example, the background color is additionally or alternatively determined based on an age of the document. The age of the document is identified by the end user or derived by interpreting the text of the document to identify a date value written on the document.

Exemplary method 80 further involves shifting the colored pixels towards the background color, as shown in block 83. For example, if the ink bleed model includes ink color, grey, red, yellow, and then background color, then some pixels of grey, red, and yellow are shifted along the gradient of the ink bleed model towards the background color. Note that a gradient of an ink bleed model can include two, three, four, five, or any other number of colors.

Figure 9:
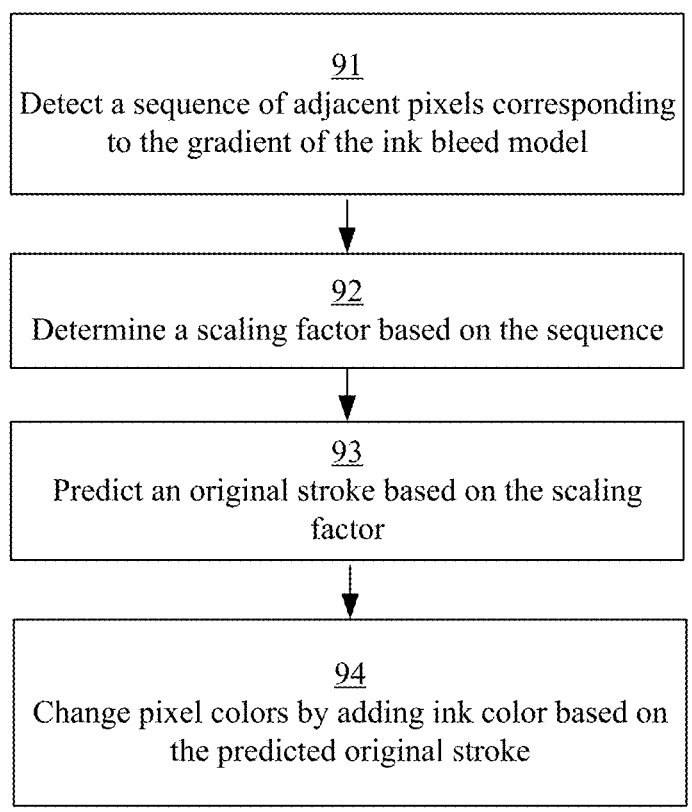
FIG. 9 illustrates an exemplary flow chart for restoring the appearances of scans of damaged physical documents using an ink bleed model and scaling factor to modify pixels.

FIG. 9 illustrates an exemplary flow chart for restoring the appearances of scans of damaged physical documents using an ink bleed model and scaling factor to modify pixels. Exemplary method 90 is performed by one or more processors of one or more computing devices such as device 2 or server 7 of FIG. 1.

Exemplary method 90 involves detecting a sequence of adjacent pixels corresponding to the gradient of an ink bleed model, as shown in block 91. For example, if the ink bleed model includes a sequence of: ink color, grey, red, yellow, and then background color, then pixels in the scanned image in a sequence of 4 grey pixels, followed by 5 red pixels, followed by 7 yellow pixels in an approximate line are detected. In one embodiment of the invention, the sequence of adjacent pixels is identified by scaling the sequence or the ink bleed model for a degree of water damage or an amount of original ink.

The method 90 detects a scaling factor based on the sequence, as shown in block 92. For example, the scaling factor is based on the total number of pixels in an approximate line of the detected sequence, e.g., 16 (4+5+7) in the example above. In a circumstance in which more bleed occurred the scaling factor would be greater and the length of the detected sequence would be greater, e.g., 32 pixels, etc.

The method 90 predicts an original stroke based on the scaling factor, as shown in block 93. In one example, predicting the original stroke based on the scaling factor involves predicting a width and darkness of the original stroke, wherein pixels in the set of pixels are determined based on the width or darkness of the original stroke. For example, the scaling factor of 16 may be used to determine that the original stroke was likely 4 pixels from the end of the grey pixels in the detected sequence and 3 to 4 pixels wide.

The method 90 next changes pixel colors by adding ink color based on the predicted original stroke, as shown in block 94. For example, this involves adding black to pixels in locations at which an original stroke is predicted in an example in which the ink color is black. In one example, the ink color is identified by analyzing the colors in the scanned image of the physical document. In one example, the pixels that are changed are a set of pixels identified based on being at a start of the gradient of the ink bleed model.

Figure 10:
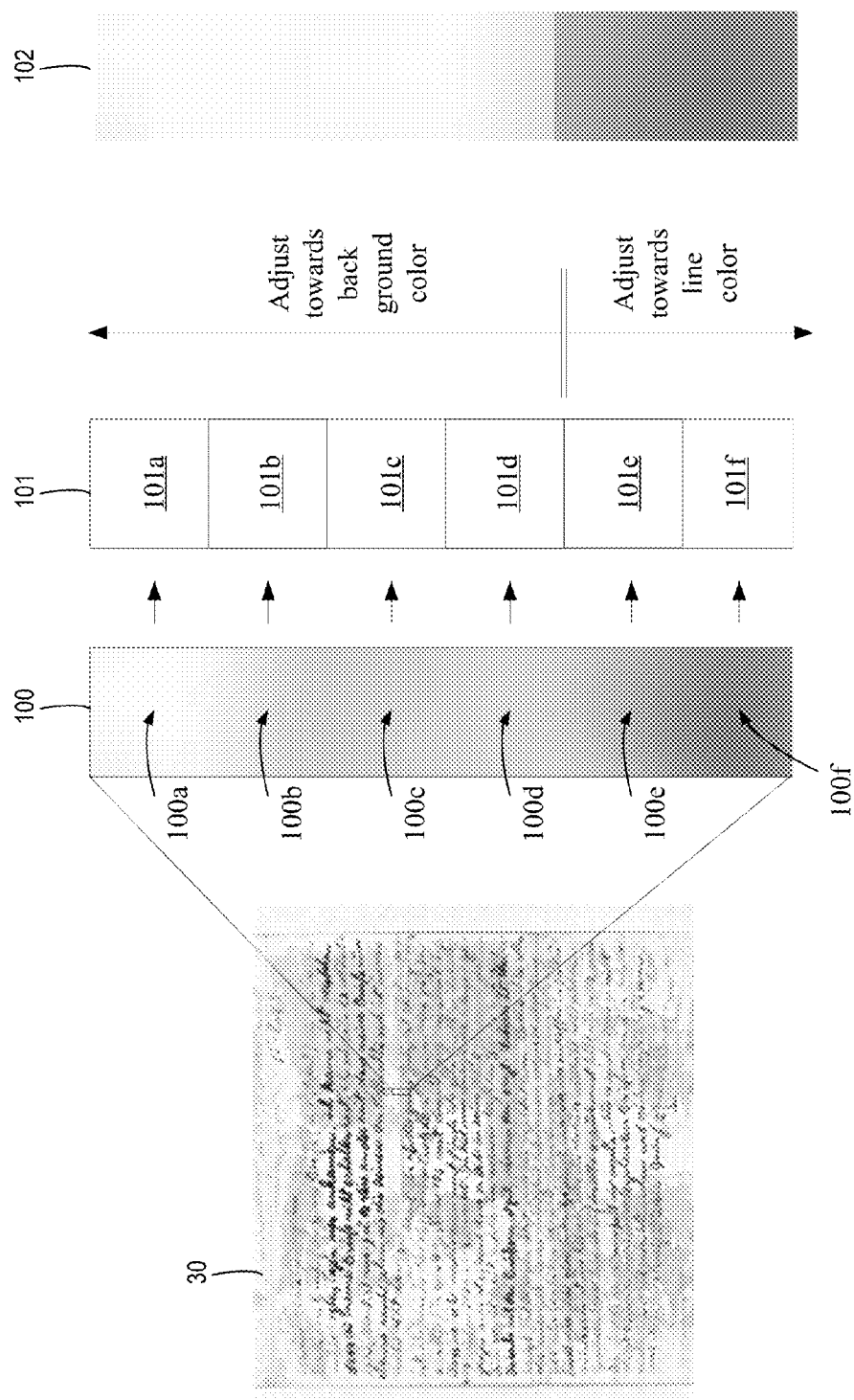
FIG. 10 illustrates matching a portions of a scan of a water damaged physical document to colors of a gradient to adjust the appearance of the scan.

FIG. 10 illustrates matching a portions of a scan of a water damaged physical document to colors of a gradient to adjust the appearance of the scan. In this example, the original scan 30 (FIG. 3) is analyzed. An area 100 of the original scan 30 is identified as having a sequence of colors 100a, 100b, 100c, 100d, 100e, and 100f that correspond to a sequence of colors 101a, 101b, 101c, 101d, 101e, and 101f respectively. The pixels in this area 100 are then adjusted based on the respective pixel's color. In this example, Pixels in the area 100 having a color corresponding to colors 101a-d are shifted towards the background color. Pixels in the area 100 having a color corresponding to colors 101e-f are shifted towards the ink/line color. In this example, the result is that the appearance of area 100 is adjusted as shown in area 102.

Figure 11:
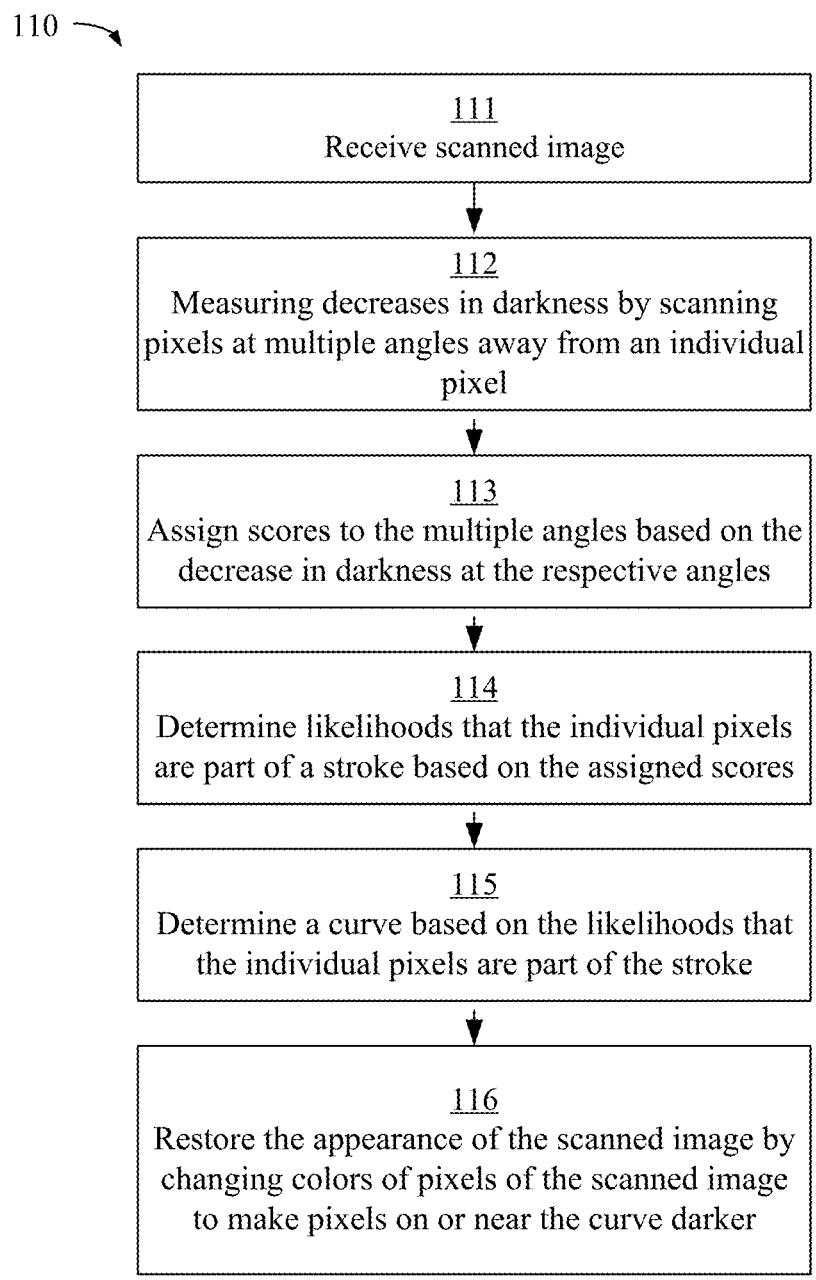
FIG. 11 illustrates an exemplary flow chart for restoring the appearances of scans of damaged physical documents by predicting stroke locations.

FIG. 11 illustrates an exemplary flow chart for restoring the appearances of scans of damaged physical documents by predicting stroke locations. Exemplary method 110 is performed by one or more processors of one or more computing devices such as device 2 or server 7 of FIG. 1.

Figure 12:
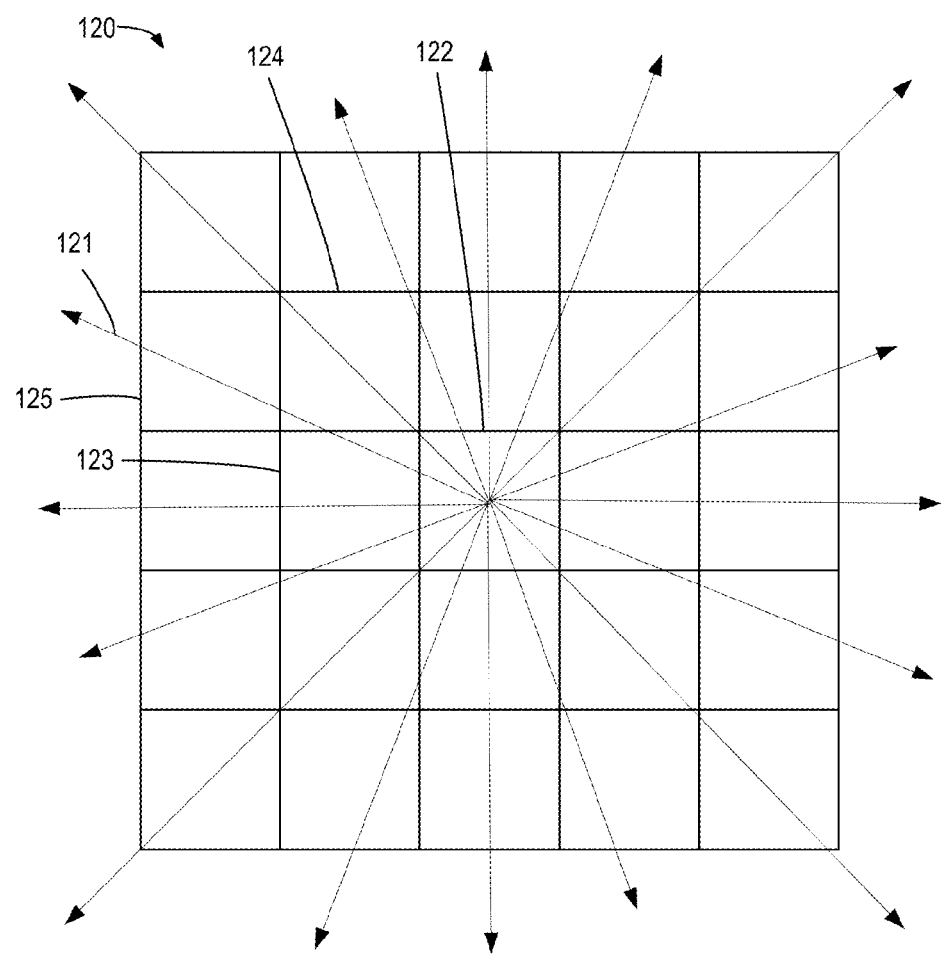
FIG. 12 illustrates measuring the decrease in darkness by scanning pixels at multiple angles away from an individual pixel in a block of pixels in a scan of a physical document.

The method 110 involves receiving a scanned image, as shown in block 111, and measuring decreases in darkness by scanning pixels at multiple angles away from an individual pixel, as shown in block 112. In one example, multiple angles are scanned by measuring angles at fixed degree increments. FIG. 12 illustrates measuring the decrease in darkness by scanning pixels at multiple angles away from an individual pixel 122 in a block of pixels 120 in a scanned image.

Returning to FIG. 11, method 110 further involves assigning scores to the multiple angles based on the decrease in darkness at the respective angles, as shown in block 113. The method 110 determines likelihoods that the individual pixels are part of a stroke based on the assigned scores, as shown in block 114, and determines a curve based on the likelihood that the individual pixels are part of the stroke, as shown in block 115. In one example, scores are based on symmetry of drop-off in darkness and distance of the drop-off from the respective individual pixel.

In the example of FIG. 12, angle 121 is analyzed by detecting the decrease in darkness from pixel 122, to pixel 123, to pixel 124, to pixel 125. By comparing the decreases in darkness at the different angles from pixel 122 in a similar way, the method 110 determines how likely it is that pixel 122 is part of a stroke. In one example, a respective angle that produces a best score for an individual pixel is determined to be a stroke direction. In another example, a sharp decrease for the angles on two opposing sides of pixel 122 but not the angles on the other two opposing sides of pixel 122 is determined to be a stroke through the pixel in the directions in which the darkness does not drop off sharply. A curve is estimated by analyzing multiple pixels in this way. In one example, determining the curve involves assembling points by seeking nearby pixels with similar angles of relatively high scores and which are similar to an angle of a line connecting the nearby pixels.

Method 110 then restores the appearance of the scanned image by changing colors of pixels of the scanned image to make pixels on or near a determined curve darker, as shown in block 116. In one example, restoring the appearance comprises making pixels on or near the curve darker in proportion to a likelihood that respective pixels are assigned to the curve.

Exemplary Computing Environment

Figure 13:
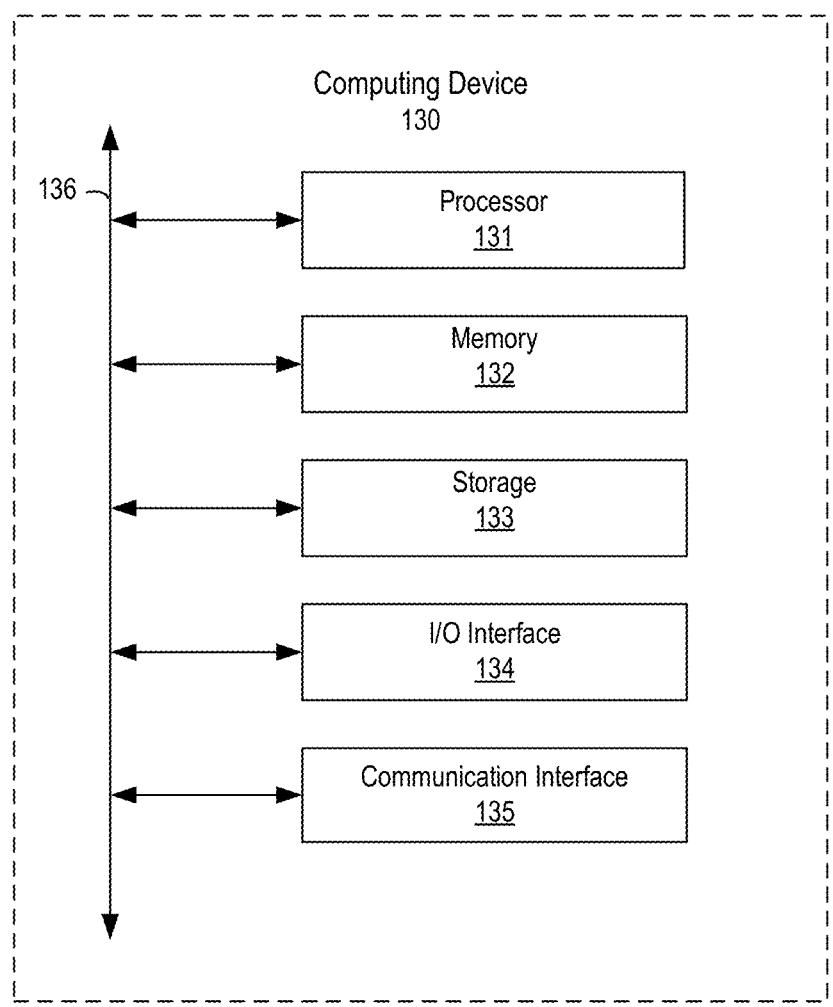
FIG. 13 is a block diagram depicting an example hardware implementation.

Any suitable computing system or group of computing systems can be used to implement the techniques and methods disclosed herein. For example, FIG. 13 is a block diagram depicting examples of implementations of such components. The computing device 130 can include a processor 131 that is communicatively coupled to a memory 132 and that executes computer-executable program code and/or accesses information stored in memory 132 or storage 133. The processor 131 may comprise a microprocessor, an application-specific integrated circuit ("ASIC"), a state machine, or other processing device. The processor 131 can include one processing device or more than one processing device. Such a processor can include or may be in communication with a computer-readable medium storing instructions that, when executed by the processor 131, cause the processor to perform the operations described herein.

The memory 132 and storage 133 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 130 may also comprise a number of external or internal devices such as input or output devices. For example, the computing device is shown with an input/output ("I/O") interface 134 that can receive input from input devices or provide output to output devices. A communication interface 135 may also be included in the computing device 130 and can include any device or group of devices suitable for establishing a wired or wireless data connection to one or more data networks. Non-limiting examples of the communication interface 135 include an Ethernet network adapter, a modem, and/or the like. The computing device 130 can transmit messages as electronic or optical signals via the communication interface 135. A bus 136 can also be included to communicatively couple one or more components of the computing device 130.

The computing device 130 can execute program code that configures the processor 131 to perform one or more of the operations described above. The program code can include one or more modules. The program code may be resident in the memory 132, storage 133, or any suitable computer-readable medium and may be executed by the processor 131 or any other suitable processor. In some embodiments, modules can be resident in the memory 132. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A computer-implemented method for restoring appearances of scans of damaged physical documents, the computer-implemented method comprising:
   receiving a scanned image of a physical document that includes ink writing;
   determining an ink bleed model by analyzing colors of pixels of the scanned image of the physical document, the ink bleed model comprising a gradient of colors from ink colors having ink bleed at different rates on the physical document; and
   restoring an appearance of the scanned image of the physical document by changing the colors of the pixels of the scanned image of the physical document to reduce the ink bleed based on the ink bleed model, wherein changing the colors of the pixels of the scanned image comprises:
  detecting a sequence of adjacent pixels corresponding to the gradient of colors of the ink bleed model,
  determining a scaling factor based on the sequence,
  predicting an original stroke based on the scaling factor, and
  based on the predicted original stroke, changing the colors of the pixels by mixing the pixels with an ink color.

2. The method of claim 1, wherein changing the colors of the pixels of the scanned image of the physical document to reduce ink bleed based on the ink bleed model comprises:
  identifying the pixels of the scanned image to be part of the ink bleed based on the colors of the pixels corresponding to the gradient of colors of the ink bleed model; and
  changing the colors of the pixels based on a background color.

3. The method of claim 2, wherein changing the colors of the pixels comprises shifting the colors of the pixels towards white.

4. The method of claim 2, wherein changing the colors of the pixels comprises shifting the colors of the pixels towards the background color, wherein the background color is identified by analyzing the colors of the pixels in the scanned image of the physical document.

5. The method of claim 2, wherein changing the colors of the pixels comprises shifting individual colors of the pixels towards white in proportion to a computed likelihood that a respective individual color is due to the ink bleed.

6. The method of claim 1, wherein the ink color is identified by analyzing the colors of the pixels of the scanned image of the physical document.

7. The method of claim 1, wherein the pixels are identified based on being at a start of the gradient of colors of the ink bleed model.

8. The method of claim 1, wherein predicting the original stroke based on the scaling factor comprises predicting a width and darkness of the original stroke, wherein the pixels are determined based on the width or darkness of the original stroke.

9. The method of claim 1, wherein the sequence of adjacent pixels is identified by scaling the sequence or the ink bleed model for a degree of water damage or an amount of original ink.

10. The method of claim 1, wherein determining the ink bleed model is automatically performed by a computer without user oversight.

11. The method of claim 1, further comprising identifying most likely pen motion paths and automatically reconstructing gaps based on the identified most likely pen paths.

12. The method of claim 1, further comprising enhancing an appearance of the scanned image by comparing pixels that are not already close to a background color or ink color with nearby pixels and, based on the nearby pixels, adjusting colors of the pixels that are not already close to the background color or ink color.

13. A computer program product for restoring appearances of scans of damaged physical documents, the computer program product being tangibly embodied on a non-transitory computer-readable storage medium and comprising instructions that, when executed by at least one computing device, are configured to cause the at least one computing device to:
  receive a scanned image of a physical document that includes ink writing;
  determine an ink bleed model by analyzing colors of pixels of the scanned image of the physical document, the ink bleed model comprising a gradient of colors from ink colors having ink bleed at different rates on the physical document; and
  restore an appearance of the scanned image of the physical document by changing the colors of the pixels of the scanned image of the physical document to reduce the ink bleed based on the ink bleed model, wherein changing the colors of the pixels of the scanned image comprises:
    detecting a sequence of adjacent pixels corresponding to the gradient of colors of the ink bleed model,
    determining a scaling factor based on the sequence,
    predicting an original stroke based on the scaling factor, and
    based on the predicted original stroke, changing the colors of the pixels by mixing the pixels with an ink color.

14. The computer program product of claim 13, wherein the ink color is identified by analyzing the colors of the pixels of the scanned image of the physical document.

15. The computer program product of claim 13, wherein the pixels are identified based on being at a start of the gradient of colors of the ink bleed model.

16. The computer program product of claim 13, wherein the instructions, when executed to predict the original stroke based on the scaling factor, are further configured to cause the at least one computing device to predict a width and darkness of the original stroke, wherein the pixels are determined based on the width or darkness of the original stroke.

17. The computer program product of claim 13, wherein the sequence of adjacent pixels is identified by scaling the sequence or the ink bleed model for a degree of water damage or an amount of original ink.

18. A system for restoring appearances of scans of damaged physical documents, the system comprising:
  at least one memory including instructions; and
  at least one processor that is operably coupled to the at least one memory and that is arranged and configured to execute instructions that, when executed, cause the at least one processor to:
    receive a scanned image of a physical document that includes ink writing;
    determine an ink bleed model by analyzing colors of pixels of the scanned image of the physical document, the ink bleed model comprising a gradient of colors from ink colors having ink bleed at different rates on the physical document; and
    restore an appearance of the scanned image of the physical document by changing the colors of the pixels of the scanned image of the physical document to reduce the ink bleed based on the ink bleed model, wherein changing the colors of the pixels of the scanned image causes the at least one processor to:
      detect a sequence of adjacent pixels corresponding to the gradient of colors of the ink bleed model,
      determine a scaling factor based on the sequence,
      predict an original stroke based on the scaling factor, and
      based on the predicted original stroke, change the colors of the pixels by mixing the pixels with an ink color.

19. The system of claim 18, wherein the pixels are identified based on being at a start of the gradient of colors of the ink bleed model.

20. The system of claim 18, wherein the instructions, when executed to predict the original stroke based on the scaling factor, are further configured to cause the at least one processor to predict a width and darkness of the original stroke, wherein the pixels are determined based on the width or darkness of the original stroke.

* * * * *